Feb. 20, 1923.　　　　　　　　　　　　　　　　　　　1,445,797
E. PEIRCE
FRUIT CONVEYING MACHINE
Filed Apr. 12, 1921　　　　5 sheets-sheet 3
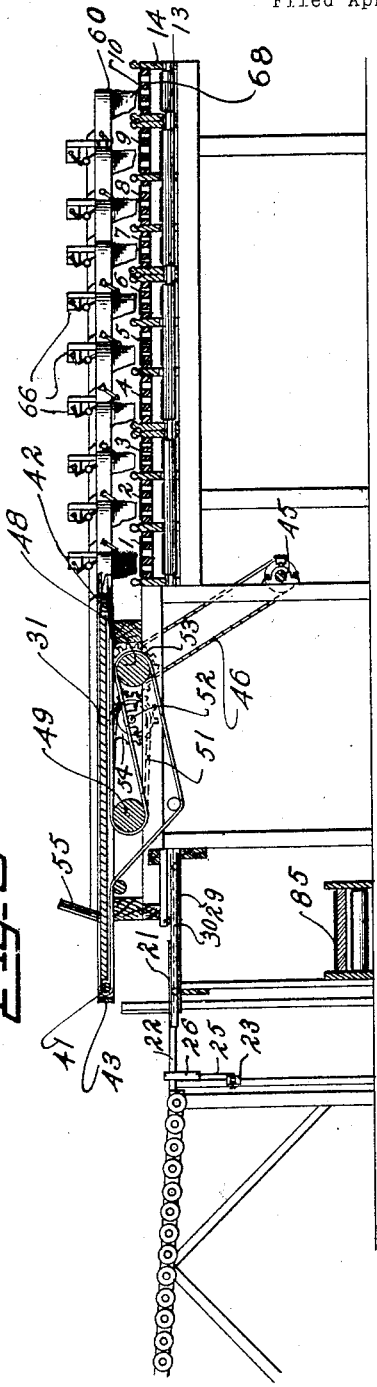
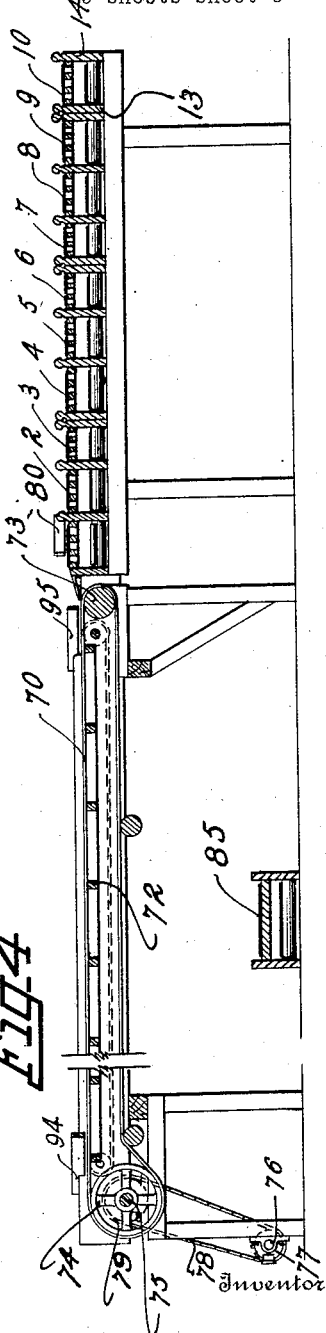
Inventor
Edward Peirce
By Herbert E. Smith
Attorney

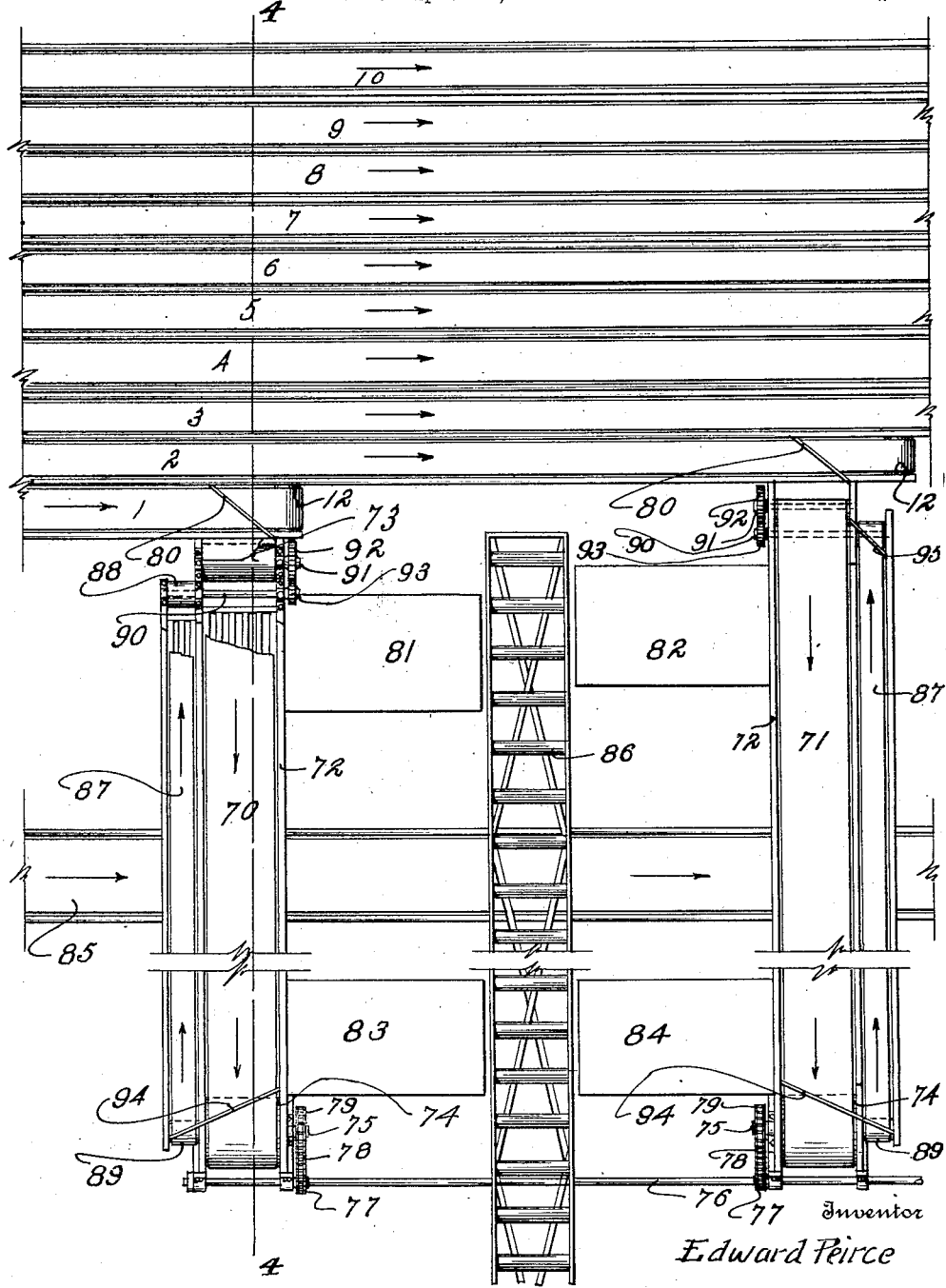

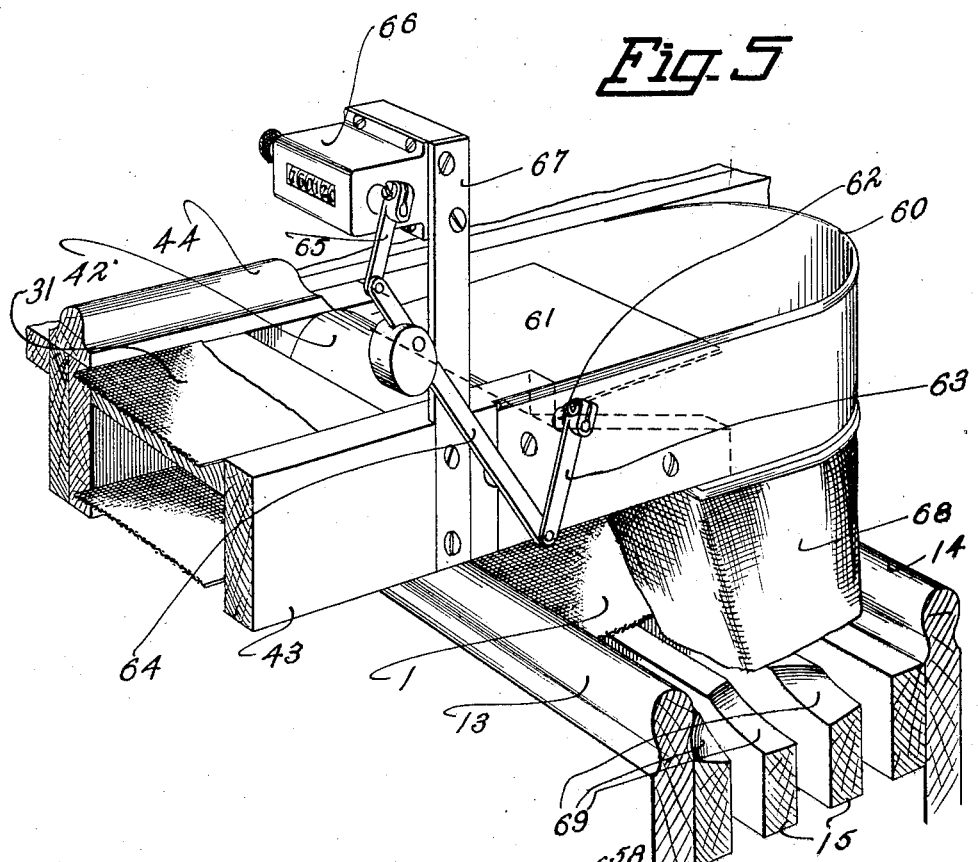
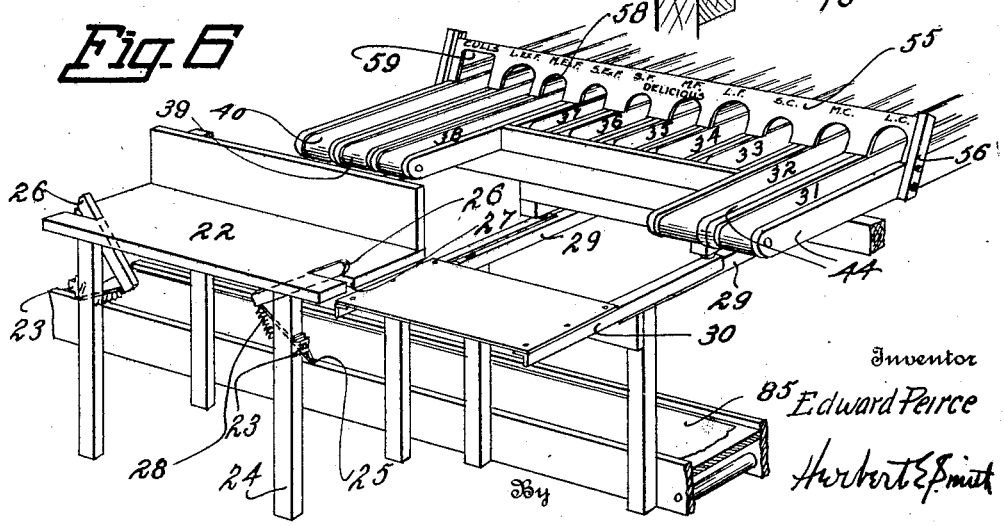

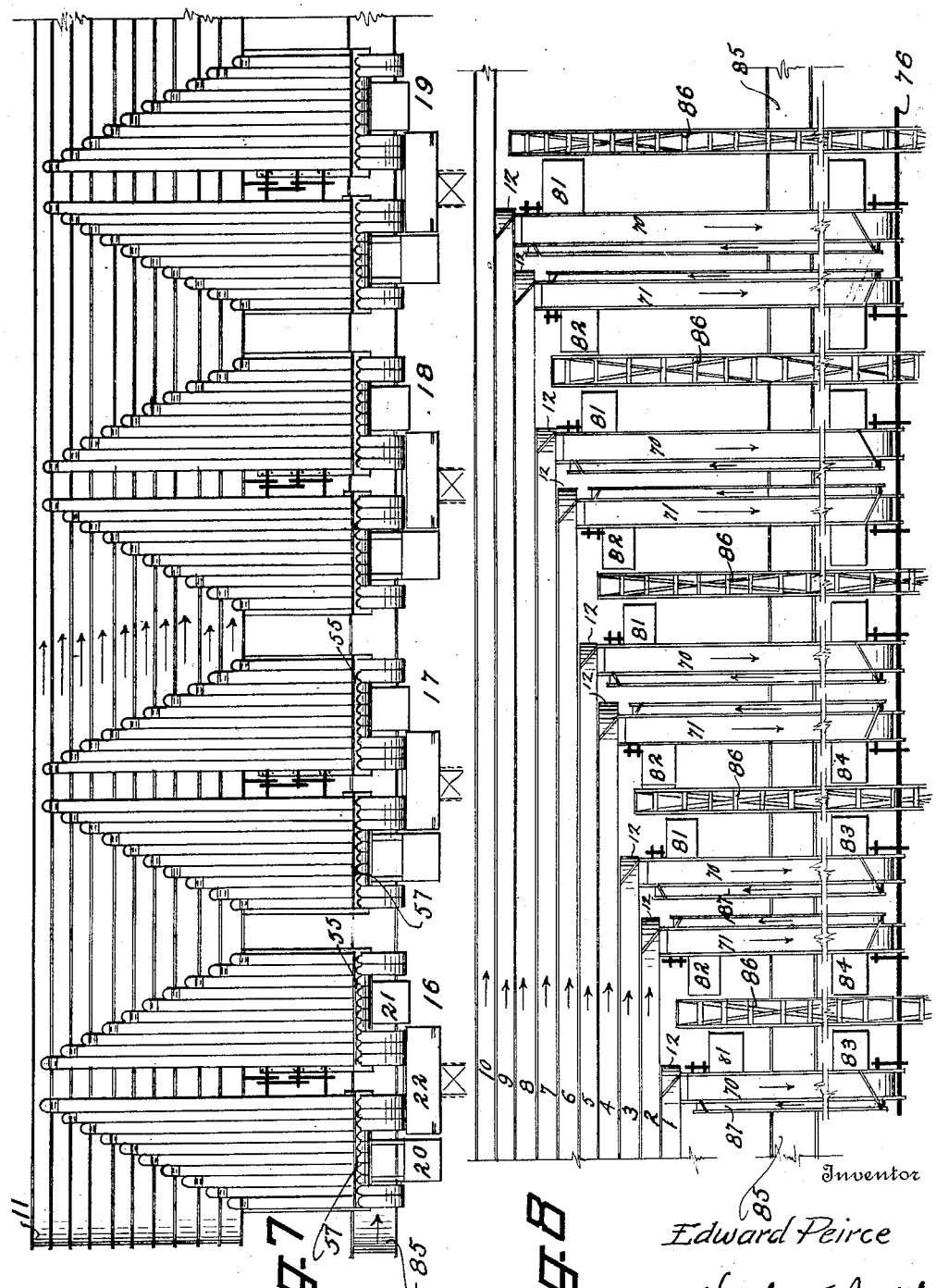

Patented Feb. 20, 1923.

1,445,797

UNITED STATES PATENT OFFICE.

EDWARD PEIRCE, OF OPPORTUNITY, WASHINGTON.

FRUIT-CONVEYING MACHINE.

Application filed April 12, 1921. Serial No. 460,665.

*To all whom it may concern:*

Be it known that I, EDWARD PEIRCE, a citizen of the United States, residing at Opportunity, in Spokane County and State of Washington, have invented certain new and useful Improvements in Fruit-Conveying Machines, of which the following is a specification.

The present invention relates to improvements in a fruit conveying machine involving also means for counting the boxes of fruit received at the machine, means for counting the individual fruits sorted, and means for delivering the sorted or graded fruit to the packer for final disposition. While the invention embodies a machine designed especially for handling apples, and will hereinafter be referred to as an apple handling machine, it will be understood that other fruit, or vegetables, may be handled with equal facility, and prepared for the market in similar manner.

In the preparation of apples for the market, it is of prime importance that the apples be subjected to a minimum of handling in order that they may not be bruised from contact with other objects, and with this object in view the machine of the present invention contemplates the utilization of compactly arranged mechanism, adapted to receive the fruit in boxes from the apple grower or orchardist, by means of which the apples are quickly sorted or graded, counted, packed and stored, or made ready for shipment to the consumer with the least possible likelihood of bruising or other form of marring. In this manner the apples are carefully handled by the sorters and packers attendant upon the machine, and packed for travel in the best possible condition to insure their delivery to the consumer in first class condition. The grade of the apples is positively determined and their preservation insured, thus enabling the packers and shippers to guarantee, with safety and reliability the condition of their products.

In carrying out the invention, the apples are delivered in boxes to the machine, sorted by hand, and the number of boxes automatically counted, the number of apples passing through the machine are counted and the culls eliminated, and finally the apples are separately and individually delivered to the packer who takes them from the machine and by hand, packs them in the box for the market, or for storage.

The invention consists essentially in certain novel combinations and arrangements of parts for carrying out the above indicated purposes and objects as will be hereinafter more fully described and claimed.

In the accompanying drawings one complete example of the physical embodiment of the invention is illustrated wherein the parts are combined and arranged in units adapted to be worked by two sorters each of whom sorts or grades the apples in three groups of three grades each and eliminates the culls, and at the delivery end of the machine a complementary pair of packers receive and pack the nine classes of apples, the culls being disposed of as desired, and as usual. The invention as illustrated is in practical commercial use and giving highly satisfactory results in the performance of its functions, and is capable of handling with dispatch and without marring of the apples, the fruit at the time of highest production of the season, and classifying the fruit in the usual grades of extra fancy, fancy, C grades and culls.

Figure 1 is a plan view of one unit of the sorting portion of the machinery, showing the box receiving platform, a pair of tables, the complementary sorting racks, two groups of sorting endless conveyers or belts, and the longitudinally extending conveyer belts or intermediate carriers for receiving the sorted apples and conveying them to the packers. It will be apparent that the length of the longitudinally extending belts or conveyers may be varied, and in like manner the number of sorting units and complementary packing units may be also varied.

Figure 2 is a top plan view, complementary to Figure 1, showing the delivery or packing belts, the packers' tables, and a return belt to relieve congestion of accumulating apples in order to enable the packer to handle them.

Figure 3 is a transverse sectional view at line 3—3 of Figure 1.

Figure 4 is a transverse sectional view at line 4—4 of Figure 2.

Figure 1:
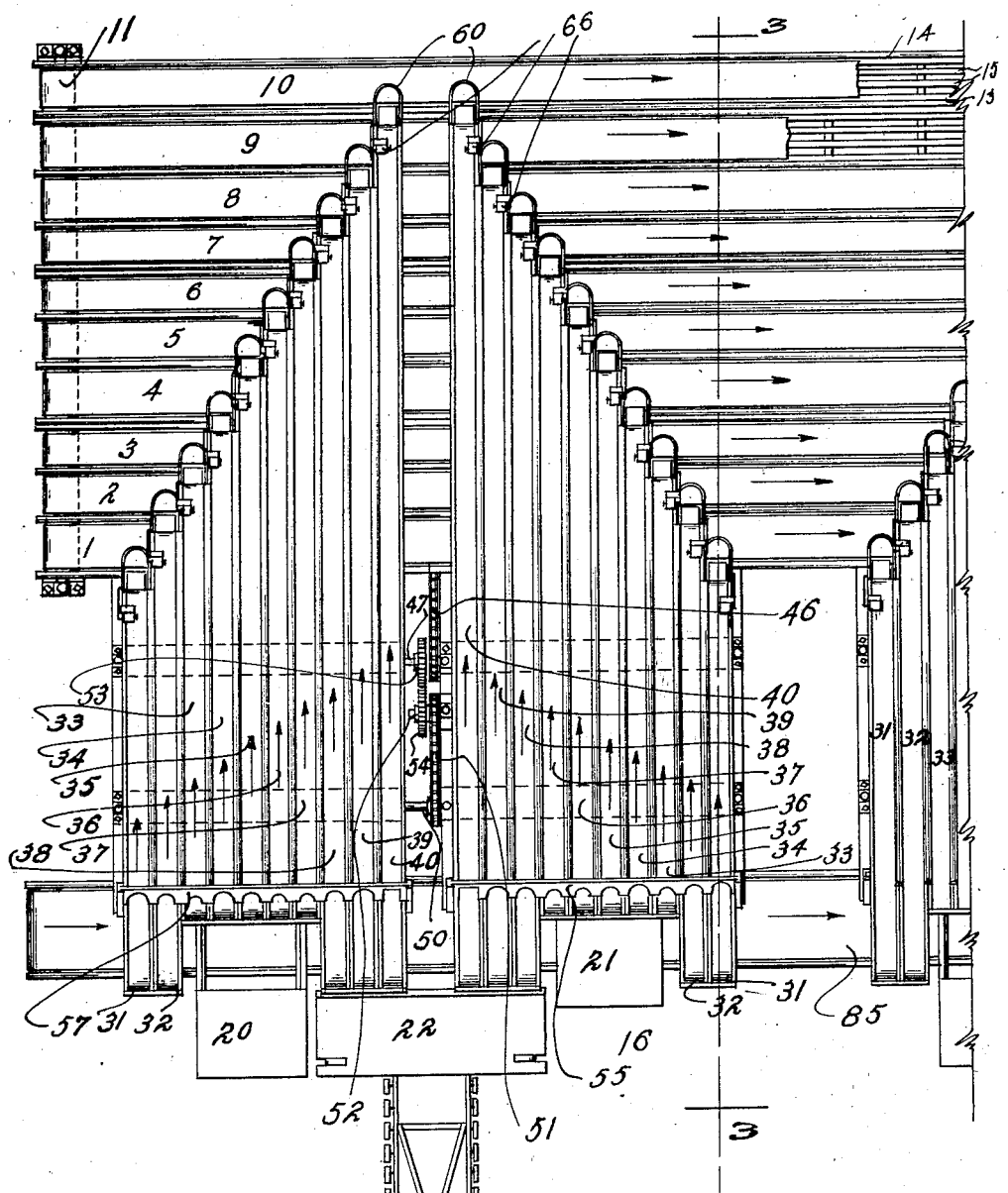

Figure 5 is an enlarged view, in perspective, and partly in section, at the end of one of the sorting belts, showing a tipping plate for actuating an automatic counter as the apple is discharged to the longitudinal belt or conveyer, which is shown at right angles to the sorting belt, together with a resilient receiver in the longitudinal belt to prevent bruising of the apple as it drops from one belt to the next.

Figure 6 is an assembly view, in perspective, at the sorting end of the machine, as at the right side of the box counting platform in Figure 1.

Figure 7 is a top plan view, on a smaller scale, illustrating four units each accommodating two sorters, and Figure 8 is a top plan view at the packing end of the machine, showing four units each accommodating four packers, and another unit accommodating two packers.

The grading machine illustrated in the drawings is about 230 feet in length and in actual use, involving ten longitudinal endless canvas belts, designated 1 through 10, the tenth or distal conveyer belt being for the disposition of culls, and the nine conveyers comprising three groups of three grades each to handle or convey the extra fancy, fancy and grade C apples, and the different groups of belts may carry three kinds of apples as for instance belts 1, 2 and 3 may carry "Delicious" apples, belts 4, 5, and 6 "Rome Beauties" and belts 7, 8, 9 "Winter Bananas" each of the three designated apples being sorted into three grades.

The conveyers belts are endless, being supported at one end on the rollers of a driven shaft at 11, as indicated at the left in Figures 1 and 7, and at the right or delivery end in Figure 8, each of the first nine conveyers has a supporting roller indicated at 12. These longitudinal, parallel conveyers are provided with side rails 13 and 14, and intermediate, spaced bars 15, to form a trough for the apples, the intermediate rails guiding and supporting the canvas belt, and the side rails guiding the belt and apples, in order that the latter may pass in continuous streams from left to right in Figures 1 and 7.

The apples are fed to the conveyer belts from sorting or grading units, of which there are four indicated in Figure 7, designated respectively 16, 17, 18, and 19, and in Figure 1 an enlarged plan view of the unit 16 is illustrated, to which attention is called for a detail description. It will be understood that the number of sorting units may be varied to increase or decrease the capacity of the machine, and one or more units may be utilized as desired. Inasmuch as the construction and operation of each unit is the same, a description of the unit 16 in Figure 1 will suffice for all units.

Each unit is adapted to accommodate two sorters or attendants, one sorter using the slide table 20 and the other using the slide table 21, the former, in Figure 1, being located in outer position to receive a box of fruit from the platform 22 and the latter in position for use by the attendant or sorter in grading the apples. The apples are received in boxes from the orchardist or grower, and conveyed to the platform 22 by a suitable conveyer not shown, the filled boxes moving transversely of the longitudinal carriers or endless belts 1 to 10, and shifted either to the right or left from platform 22 to the table 20 or 21 as the case may be. By this shifting movement of the box of apples, the boxes are automatically counted by means of a counter 23 located on one of the frame posts 24, and actuated by the arm 25 which is operatively connected to a pivoted lever 26. This lever is pivoted below the platform 22 with its upper end projecting through an open slot 27 in the edge of the platform, and as the box of apples is shifted by the sorter or grader from the platform to a table as 21, the projecting end 26 of the lever is depressed to actuate the counter through the medium of the arm 25, and after the box has been shifted and its weight removed from the depressed lever, the lever is returned to normal position by means of the contractile spring 28 which is attached to the lever and to the post 24. There are two of these counters for each unit, located at the opposite ends of the platform 22 in order that the successive boxes shifted by each of the two sorters, may be counted and registered by the counting devices. In this manner the number of boxes brought to the machine by the orchardist or apple grower is counted and registered for the purpose of securing a record for future use.

The tables 20 and 21 are movable forward and backward for the convenience of the sorters, and are supported on and guided by ways or tracks 29 with which the slide arms 30 of the tables co-act, the latter sliding in exterior grooves of the former to form a stable support and guide for the tables. A box of apples is shifted from the platform to the alined table as 20 in Figure 1, and then the table is shifted to the position of table 21 in the same figure, from which position the apples are taken from the box by the sorter, and started on their journey to the packers.

Each sorting unit, as 16 in Figure 1. comprises two sets of endless, canvas belts indicated in each set by the numbers from 31 to 40, the belts or conveyers 40 each being longer than all the others and extending to the cull conveyer 10 of the longitudinally extending belts. These sorting belts are of various lengths and extend at right angles to the longitudinal conveyers and transversely of the machine, their upper flights moving away from the tables 20 and 21.

The sorting belts are located above the conveyer belts 1 through 10, and the proximate ends of these sorting belts pass over pulleys or rollers 41 while the distal ends of the belts pass over complementary rollers 42 journaled in the supporting frame 43 which is fashioned with side rails 44 for guiding the belts and apples placed thereon in their movement toward the longitudinal conveying belts.

As best seen in Figure 3 the sorting belts are actuated from the longitudinally extending main shaft 45, which has a driving sprocket wheel connecting by the sprocket chain 46 with a similar wheel on the countershaft 47. The shaft 47 is properly journaled and has thereon a pair of comparatively long rollers 48 revolving therewith over which the belts of the two sets of the unit pass, the belts being looped in their lower flights, as seen in Figure 3, and a second pair of long rollers 49, parallel with the rollers 48 and spaced therefrom, support another bend or loop in the lower flight of each of the belts of the unit. Guide rollers for the belts are also utilized, and this arrangement of guiding and driving rollers insures a steady and uniform movement of the upper flight, or carrier flight of the several belts. The rollers 49 revolve with a shaft 50 which is driven by the sprocket chain 51 passing over sprocket wheels on said shaft 50 and a gear shaft 52 respectively, while the gear shaft is driven by the train of gears 53 54 from the shaft 47.

In Figure 6 a feed rack 55 is illustrated, as supported by brackets 56 from the sorting frame, its complementary rack 57 completing the pair of feed racks to each unit of the sorting portion of the machine. These racks are supported, preferably at an angle, over the proximate ends of the sorting or grading belts, and each rack is provided with three groups of notches, each group representing three grades of apples, classified as to size and the notches indicated as 58, while the tenth notch 59 is for culls, or undesired apples. The notches are cut in the lower edge of the rack board, to correspond and register with the ten sorting belts, and it will be apparent that the sorter or attendant, after sufficient practice may with facility and accuracy place the apples on the sorting or grading belt corresponding to the size of the notch through which it is expected to pass. The notches may have designating marks above them, as shown in Figure 6 to guide the sorter in placing the apples of different kinds on the sorting belts, and as all the racks are similarly designated it is obvious that the apples issuing from all the sorting units will be deposited upon the respective conveyer belts for travel to the packing end of the machine.

At the distal end of the grading belts, the apples are transferred to the respective, longitudinal conveyer belts, and the transferring device includes a rounded U-shape end plate 60 attached to the complementary ends of the side rails 44 forming the trough walls for the apples and belts. The plate forms a space beyond the end roller 42 and the end of the belt 31, in which a tiltable plate 61 is located, and this tiltable plate forms a continuation of the path from the belt 31 for the apples in their progress toward the longitudinal conveyer belt. The weight of the apple as it rolls over the plate, tips the plate on its pivot or rock arm 62 journaled in the curved end plate 60, and this rocking motion of the arm 62 actuates the train of lever arms 63, 64, 65, to operate counting and registering mechanism within the housing 66 of the counting machine, all supported on the bracket 67 attached rigidly to the side rail 44. The bracket rises vertically from the rail and the counting mechanism is supported over the top of the grading belt, the indicating devices being visible through a window in the housing as usual. By the operation of the counting and registering device, the successive apples, as they pass singly over the tilting plate, are recorded, and as each grading belt is equipped with one of the tilting plates and a counter, it will readily be apparent that the number of apples passing over each grading belt and tilting plate is registered and indicated on the counting mechanism.

The tilting plate is suspended in the opening within the curved end plate of the apple grader, there being sufficient space for the apple to fall from the tilted plate, through the rounded end plate, and thence through a soft flexible trough as 68, which guides the apple as it drops to the conveyer belt 1 beneath the end of the grading belt.

The falling movement of the apple is comparatively short and limited, but to insure a cushion for its deposition and prevent marring of the apple as it falls, provision is made for the reception of the apple as it is deposited on the longitudinal conveyer 1, and all other similar conveyers.

The spaced rails 15, between the lateral rails 14 and 13 forming the troughs for the conveyor belts, are cut away or recessed at their upper edges, as indicated at 69 in Figure 5, to permit the belt 1, which is flexible, to give, or sag into this recessed portion when the apple contacts with the belt. Thus when the apple falls from the tilting plate through the spout 68 it is deposited upon a resilient and flexible, moving belt or carrier, the sagging of the belt absorbing the impact of the falling apple, and then the apple is carried forward toward the packers in an unharmed and unmarred condition. It will be understood that each of the conveyor belts at the point where they receive the apples from the grading belts, is provided with one of these cushion-receiving or sagging, resilient pockets.

In Figure 8 a number of receiving or packing units are illustrated as complementary to the grading units shown in Figure 7, and in Figure 2, an enlarged view of one of the packing units is illustrated in top plan view, complementary to the grading unit of Figure 1.

As before stated, the culls or undesirable fruit, are carried by the belt or longitudinal conveyer 10 in Figure 2, past the packing units, as in Figure 8, and the culls are disposed of as desired.

Each packing unit serves two conveyer belts and disposes of the apples supplied thereto by two complementary grading belts, through the medium of the complementary longitudinal conveyer belts. As shown in enlarged plan view in Figure 2, each packing unit includes a pair of spaced canvas belts, as 70 and 71 located transversely of the conveyer belts 1 through 10 and at the same side thereof as are the sorting or grading units, with the upper flight of the belts moving in the direction of the arrows away from the conveyer belts. A frame 72 is provided for each belt, and the belts are passed over the end rollers 73 and 74, the latter being a large roller or pulley rotatable with longitudinally extending shaft 75 which is driven from the driving shaft 76 through the sprocket wheel 77 on the latter shaft, a sprocket chain 78, and a sprocket wheel 79 on the driven shaft 75 (see Figure 4). The driving shaft is located near the floor and extends the full length of the several packing units, driving the belts of each unit as illustrated in Figures 2 and 4. At the terminal of each of the conveyer belts, an obliquely extending, rigid deflector 80 is provided and adapted to deflect the moving apples from the respective conveyer belts to the packing belts as best seen in Figure 2, and while this deflector is rigidly held, it may be of flexible or soft material to avoid bruising the apples as they contact therewith and are deflected, one after another, from the conveyer belt to the packing belt.

In Figure 2 four benches 81, 82, 83, 84 are shown, arranged in pairs, between the two packing belts, for the convenience of the fruit packers, and empty boxes are supplied to the packers by means of the longitudinally extending box-conveying belt 85 which is properly supported and actuated with its upper flight moving to the right as indicated by the arrows, and passing beneath the packing units at the ground level. As required, the empty boxes are lifted from their conveyer by the packers, placed upon the packing bench, as 81, and as the apples are transferred from the longitudinal conveyers to the packing belts the packers lift each apple, wrap it by hand, with paper and deposit the wrapped apple in the waiting box. An off-bearing, conveyer of the roller type as 86 is located between each pair of packing belts of a unit, which moves at right angles to the conveyer belts and away therefrom, and as the boxes are filled they are deposited by the packers on this off-bearing conveyer to be received at a terminus where the lids are nailed or otherwise fastened and the boxes are ready for storing or shipping as the case may be.

In the event the apples are supplied to the packers too rapidly for immediate handling, congestion is avoided on the packing belt by the utilization of a return belt 87, one of which is used in connection with each of the packing belts 70, 71, and as indicated by the arrows in Figure 2 these return belts have their upper flights moving in the opposite direction to that of the belts 70, 71. The return belts are supported on end rollers 88 and 89 at the outer edges of the packing belts and parallel therewith and the rollers 88, which are the drive rollers, are fixed on the countershafts 90 that are driven from the shaft 91 of the driven rollers 73 by the large gear 92 on said shaft and the smaller gear 93 on shaft 90. At the proximate end of the packing belts a wide deflector 94 extends obliquely over the packing belts and their auxiliary return belts by means of which the apples that may travel the length of the packing belts are transferred to the return belts and by these latter belts moved back to the distal end of the belts, and thence, by another deflector 95 the apples are transferred from the return belt to the packing belt 70 or 71 for another trip over the packing belt. In this manner a congestion of apples is prevented on the packing belts and the packer is enabled to "catch up" with the stream of in-coming apples, wrap them singly, and deposit them in the boxes resting on the benches as described.

When the box has been packed with apples, it is shifted to the off-bearing roller conveyer 86, and shoved over to the attendant who puts on the lid and secures it in place, marks the box as required to identify the type and grade of fruit, and the box may then be stored, or transported direct to the railway cars for shipping. The culls, which have been separated out and are carried by the last conveyer belt 10 may be transported to a bin for suitable disposal in making vinegar, cider, stock food or the like, as is customary.

While one complete exemplification of the invention is herein shown and described, it will be apparent that changes and alterations may be made, as for instance the spout 68 may be omitted; the number of grading units and the corresponding number of packing units may be varied, the minimum number of units being one, while the maximum number may vary with the capacity of the grading machine and the size of the crop of fruit to be handled. Means may be provided for operating the grading and packing belts and in connection therewith clutch devices for rendering operative or inoperative, as the case may require, the different driving connections from the main shafts 45 and 76 of the respective grading and packing instrumentalities.

The number of kinds of apples may be varied, as for instance only "Delicious" apples may be graded and passed through the three notches of a set in the rack 55, the culls being disposed of through the notch 59; two kinds as Delicious and Roman Beauties may be handled; or three kinds Delicious, Roman Beauties and Winter Bananas may be graded simultaneously.

As many changes could be made in the above described construction, and many apparently widely different embodiments of this invention could be made without departing from the scope thereof, it is understood that all matter contained in the specification and described or shown in the drawings shall be interpreted as illustrative and not in a limiting sense. It is also to be understood that the language used in the following claims is intended to cover all of the generic and specific features of the invention herein described and all statements of the scope of the invention, as a matter of language might be said to fall therebetween.

Claims:

1. The combination in a fruit conveying machine with a moving belt and a supporting frame, of an upper belt adapted to deposite fruit on the first belt, and means in said frame at the point of deposit for forming a cushion in the first belt.

2. The combination in a fruit conveying machine with a moving belt and a supporting frame including spaced longitudinal rails beneath the conveyer flight of the belt, and said rails having recesses in their upper edges adapted to form a pocket in said belt when the latter is depressed under weight of a falling fruit.

3. The combination in a fruit conveying machine with a moving belt and supporting, spaced, longitudinal rails having recesses in their upper edges, of an upper conveyer belt adapted to deposit fruit on the first belt directly over said recesses, whereby a cushioned pocket is formed at the point of deposit.

4. The combination with a moving belt and supporting, spaced, longitudinal rails having recesses in their upper edges, of an upper conveyer belt disposed at an angle to the first belt, an extension frame beyond the end of the second belt and a delivery spout between said frame and the top of the first belt, for the purpose described.

5. The combination in a fruit conveying machine with a moving belt having spaced longitudinal supporting rails with recesses in their upper edges, of a conveyer including a belt disposed at an angle above the first belt and a supporting frame therefor, an open extension on said frame, and a tiltable member forming part of the conveyor within said extension directly in line with the second belt.

6. The combination with a plurality of longitudinal conveyer belts having spaced terminals, of a complementary, angularly disposed packing-belt for each conveyer belt, and means for transferring fruit from each conveyer belt to its complementary packing belt.

7. The combination with a plurality of longitudinal conveyer belts having spaced terminals, of a complementary, angularly disposed packing belt for each conveyer belt, and an obliquely disposed deflector member for each conveyer belt for transferring fruit from each said belt to a packing belt.

8. The combination with a longitudinally extending conveyer, a transversely extending conveyer and means for transferring fruit from the former to the latter, of a return conveyer parallel with and co-acting with the second conveyer, an obliquely disposed deflecting member for transferring excess fruit from the second conveyer to the third conveyer, and an obliquely disposed deflecting member at the opposite end of the third conveyer for transferring excess fruit to the second conveyer for the purpose described.

In testimony whereof I affix my signature.

EDWARD PEIRCE.